Patented June 15, 1948

2,443,576

UNITED STATES PATENT OFFICE 2,443,576

METHOD OF PRODUCING LIGNIN RESINS

Eduard Farber, New Haven, Conn., assignor to Timber Engineering Company, New Haven, Conn., a corporation of Delaware No Drawing. Application July 3, 1944, Serial No. 543,415

12 Claims. (Cl. 260—97)

My invention relates to resins and the productions of resins from, on the one hand, abietic acid either in the form of rosin or otherwise, or certain derivatives of abietic acid and rosin, and, on the other hand, the residues remaining from certain chemical reactions on lignin-containing vegetable matters.

Abietic acid as such can be used in my process. As an alternative, equivalently acting derivatives of abietic acid can be substituted, such as an anhydric form of the acid. Preferably however, under present economic conditions I use the abietic acid in the form of rosin (either gum or wood rosin), or in the form of a hydrogenated, dehydrated or decarboxylated derivative of rosin. Speaking generally, any derivative of rosin that is capable of yielding water of reaction can be used. Also mixtures of the foregoing can be used. For brevity I use the term "abietic acid" hereafter as including this acid itself, rosin, and the derivatives and modifications of the acid and rosin indicated above, except as otherwise may appear. Also I use the term "rosin" as including both rosin per se and its derivatives and modifications indicated above, except as otherwise may appear.

The residue used in my process is lignin produced by hydrolysis of woody material and the separation of substantially all the carbohydrates therefrom. A mixture of such residues may be used. For example, the residue can be the precipitate obtainable by acids from "black liquor" (the alkaline solutions resulting from the treatment of wood in the alkaline cooking processes used to produce cellulose). Usually however I separate out the water soluble matters of such precipitates, using only the remainder in my resin process, and usually I dry the precipitate (or remainder) before using it in my process. Again, the rather insoluble solid residue of the saccharification of the carbohydrates of wood can be used in my process. It is immaterial for the present purposes whether the saccharification is by a concentrated acid method (for example, by concentrated sulfuric or hydrochloric acid) or whether by a dilute acid or acids at higher temperatures. The kind of vegetable matter from which the residue of my invention is obtained is immaterial, speaking generally. For example, it may be a residue from a wood, or from stalks, hulls, grasses, etc.

Briefly, I have found that a mixture of abietic acid and lignin (both as defined above) will react at about 200° C. and higher temperatures and thereby produce a resin or resins. The pressure can be atmospheric pressure. The reaction takes place slowly at about 200° C., but more rapidly at higher temperatures. By heating to from about 260° C. to about 300° C. in the case of lignin derived from alkaline solutions and to from about 300° C. to about 360° C. in the case of lignin derived from the saccharification of wood, the reaction can be brought to completion within practical limits of time. The combining proportions are one part of lignin to at least about one part of abietic acid. All the proportions in this specification and claims are by weight, except as otherwise stated. Usually I mix the ingredients by adding the lignin to the molten acid while stirring, and usually I continue the stirring (or some other form of mixing) throughout the whole of the heating period. At such proportions as about one to one however the mixture is higly viscous usually, and in order to reduce the viscosity it is advantageous to use greater quantities of the abietic acid, or to add to the mixture some of the oil produced by the reaction as hereafter appears, or to use both the oil and an excess of the acid. To a greater or lesser degree the surplus of acid may be reduced during or removed after the completion of the reaction. For example, the reaction can be begun with, say, one part of lignin and two parts of the abietic acid, and later more lignin added to the reacting mixture, thus in effect reducing the proportion of the acid. After the completion of the reaction and cooling of the resulting mixture, any excess acid, and likewise oil added to reduce the viscosity of the mixture, can be separated from the solidified resin, for example by washing with alcohol or alkali. Speaking generally, the only limits on the quantity of abietic acid and the oil that can be used in the reacting mixture, are those imposed by any need there may be for removing oil and surplus acid from the residue of the reaction in order to segregate the resin thereof. As the reaction proceeds, gases or vapors, e. g. of water of reaction and water-insoluble oils, are driven off, and are allowed to escape; as desired they can be recovered, for example by condensation. The size of the particles of the lignin affects the speed of the reaction. Speaking generally, the larger these particles the slower the reaction. Preferably I use lignin in fine particles, for example particles no larger than 1 millimeter in any direction. The end of the reaction is indicated by the disappearance of the lignin particles and the formation of an apparently homogenous melt.

The melting point of a resin produced as above indicated can be changed and also its sensibility to acids and alkalis reduced, by heating the resin for a time to temperatures such as those at which the reaction was carried on, or to temperatures higher than this, and allowing the resulting gases and vapors to escape. In general, such treatment tends to raise the melting points of the resins, although in some instances, for example in the case of a resin from black liquor, such treatment tends to lower the melting point. Also the melting point of the resins can be raised as desired, even to the point where the resin is substantially infusible, and also their sensibilities to acids and alkalis lowered, by heating in the presence of certan reagents as appears hereafter.

The addition to, or presence in, the mixture of abietic acid and lignin of a small amount of a mineral acid or acids, for example sulfuric acid, hydrochloric acid, phosphoric acid, etc., say up to about 1 part (of the concentrated acid) to each 200 parts of the lignin, may be helpful in the resinification reaction. An equivalent quantity of a diluted mineral acid can be used. However, the presence, in the mixture of abietic acid and lignin, of mineral acids like sulfuric acid, phosphoric acid, etc., in excess of about 1 part of acid to 200 parts of lignin, tends to prevent the resin-forming reaction by charring the lignin before it can combine with the abietic acid.

The resinous products of the reactions are hard, brittle, dark materials of a high gloss. They are substantially insoluble in water, dilute alkalis and acids, but in the form produced by the reactions are soluble in various organic liquids such as aromatic hydrocarbons and chlorinated aliphatic hydrocarbons; however, they are generally insoluble in the aliphatic hydrocarbons themselves, and in vegetable oils. The melting points of the resinous products as initially produced are in the neighborhood of from 90° C. to 175° C., varying according to the particular materials used in their production. Heating the resins to about 300° C. without the presence of reagents, does not change them substantially, except as the heating may bring about the escape of gases and vapors and a consequent change in the melting points and an increase of their stabilities to acids and alkalis. They are useful as coatings to protect paper, metals, concrete, etc., against acids, alkalis and oils, and to render fibrous and other materials resistant to water. They are highly stable electrically, and accordingly may be used as electrical insulators or to improve the electrical insulating properties of the materials to which they may be applied.

The following are some specific examples of my process:

*Example 1.*—Take 400 grams of precipitate obtained from black liquor by means of carbonic acid gas, and filtered and dried and reduced to a rather fine powder, and stir it into 480 grams of molten FF rosin at a temperature of about 120° C. Heat the mixture to raise its temperature to about 255° C. in say, about 2 hours, and then raise its temperature to about 265° C. in say 10 minutes, stirring continuously throughout the whole time and allowing the evaporate to escape; about 22 ccm. of water and 2 ccm. of oil will be evaporated. At the end of the period the particles of lignin will have disappeared and the melt will have become apparently homogeneous. Cool the melt, or allow it to cool, until the resinous material solidifies (it may be cooled to a still lower temperature, say to room temperature). The solid recovered is about 800 grams of resin which has a melting point of about 110° C. to 115° C.

*Example 2.*—Take 542 grams of the residue from the acid saccharification of Douglas fir, which may contain, say, about 62 grams of moisture and small amounts of mineral acids, and also take about 50 ccm. of the oil evaporated during an earlier use or uses of my process and recovered by condensation. Mix these with 640 grams of a molten Belro grade of rosin. The oil is included in this mixture to facilitate the stirring and mixing of the lignin and rosin, since without the oil a mixture of this lignin and rosin in the proportions mentioned is so viscous, even at 250° C., as to be difficult to stir efficiently. Gradually raise the temperature of the mixture of the three ingredients to about 310° C., and then to 330° C. in say about 25 minutes, stirring the mixture throughout the whole of the heating period and permitting the resulting vapors or gases to escape from the melt. About 18 ccm. of oil and about 131 ccm. of water are driven off. At the end of the period the lignin will have disappeared and the melt become homogeneous. Cool the product, and after cooling separate out its liquid portion, say by washing with alcohol or an alkali. The remaining solid will consist of about 890 grams of resin, having a melting point of about 135° C.

Incidentally, since the lignin of the foregoing example is (has been assumed to be) accompanied by about 62 grams of water, and since the 640 grams of rosin will split off 19 grams of water on dehydration, 50 grams of the 131 grams of water evaporated from the melt are due to a reaction of the lignin. This corresponds to about 1 mol of water from about 160 grams of the lignin of the Douglas fir, which usually is assumed to be the molecular weight of the molecular building unit of natural lignin.

*Example 3.*—This example illustrates the use of dehydrated and decarboxylated rosin. Such a rosin derivative can be obtained by heating 100 parts of say, a mixture of several grades of wood rosins with about 2 parts of a non-activated bentonite. The ultimate product is soft at room temperature and has an acid number of about 20. Mix about 452 grams of a lignin, say the residue, or obtained from the residue, of the saccharification of a soft wood, e. g. ponderosa pine (corresponding to about 400 grams of the dried lignin), with 480 grams of the dehydrated and decarboxylated rosin, previously melted. Raise the temperature gradually by heating to about 340° C., and then in another 20 minutes raise the temperature to about 355° C., stirring the mixture throughout the whole of the time and permitting the vapors to escape. The lignin will have disappeared by the end of the time. On cooling the resulting resin solidifies at about 175° C., and about 736 grams are obtained.

*Example 4.*—Mix 600 grams of hydrogenated rosin (for example that known in commerce as Staybelite) with 500 grams of dried lignin, say that obtained from saccharification of wood, and heat the mixture to raise the temperature gradually to about 350° C., stirring the mixture and permitting the vapors to escape, when the reaction will be complete. On cooling about 920 grams of resin are obtained.

*Example 5.*—Mix 2 parts of abietic acid with 1 part of lignin, and heat the mixture to or toward temperatures of the order indicated above, with stirring, until the lignin, or, say, the major part of it, has dissolved. Then add another 1 part of lignin, which can be added at this time without producing a mixture of such high viscosity as would have resulted from mixing the total of two parts of the lignin with the two parts of abietic acid initially. If desired the oil evaporated during the first step of the operation and recovered (or an equivalent quantity of such oil obtained otherwise) can be added to the mixture with the second part of the lignin, and thereby the viscosity of the mixture in the second stage reduced. Continue the heating to temperatures as indicated before, with stirring, and at all times permitting the gases or vapors driven off to escape from the reacting mass, until all the lignin has disappeared, and then cool the melt and separate the resulting resinous solid from any liquid there may be as necessary or desired. By such procedures, the tendency of the necessary quantities of abietic acid and lignin to form mixtures of undesirably high viscosities can be avoided without using an excess of the acid.

Example 6.—Take the 800 grams of resin of Example 1 above, and heat it to between 290° C. and 320° C. for about 3 hours, permitting the vapors and gases to escape. About 23 ccm. of water and about 42 ccm. of oil are driven off. The melting point of the resin so treated is about 90° C., as may be contrasted with the melting point of about 110° C. to 115° C. of the initial resin.

Example 7.—Take 100 parts of a resin produced in accordance with my invention (for example, a resin produced in accordance with one of the foregoing specific examples of my invention), melt it and add to it from about 0.2 (two-tenths) of 1 part to about 2 parts of hexamethylenetetramine and hold the mixture at from about 106° C. to about 210° C. for a time, say less than 30 minutes. The resin then will have a higher melting point than before. Speaking generally, the greater the quantity of hexamethylenetetramine the lower may be the temperature used and the shorter the time of heating to secure a given result; again, the higher the temperature the shorter can be the time to secure a given result; still again, for a given quantity of the reagent, the higher the temperature and the longer the period of heating, the higher is the melting point of the resulting product. By such action the melting point can be increased from a few degrees up to a point where the resin becomes a substantially infusible resin. Boric acid (from about ½ part to about 5 parts to each 100 parts of the resin), aromatic nitro derivatives, or a mixture of glycerin and sulfuric acid (from about 4 to about 10 parts of glycerin and from about 1.4 to about 4 parts of 100% sulfuric acid to each 100 parts of the resin) may be substituted for the hexamethylenetetramine in this example, with or without some departures from the temperatures stated.

It will be understood that my invention is not limited to the details described above except as appears hereafter in the claims.

I claim:

1. The process which consists of mixing one part of lignin produced by hydrolysis of woody material and the separation of substantially all of the carbohydrates therefrom, with at least about one part of abietic acid, and, while allowing vapors driven off to escape from the reacting mass, heating the mass to at least about 200° C. until the mass forms a homogeneous melt.

2. The process which consists of mixing one part of lignin produced by hydrolysis of woody material and the separation of substantially all of the carbohydrates therefrom, with at least about one part of abietic acid, and, while allowing vapors driven off to escape from the reacting mass, stirring and heating the mass to at least about 200 C. until the mass forms a homogeneous melt.

3. The subject matter of claim 1, characterized by the fact that more than one part of the acid is mixed with one part of the lignin.

4. The subject matter of claim 1, characterized by the fact that a quantity of oil, obtained by condensation from vapors escaping in a prior operation of the process, is added to the mixture.

5. The process which consists of mixing less than one part of lignin produced by hydrolysis of woody material and the separation of substantially all of the carbohydrates therefrom, with about one part of abietic acid, heating the mixture to at least about 200° C. until at least a considerable part of the lignin has disappeared, and then adding additional amounts of such lignin to the reaction melt and continuing the heating, vapors driven from the reacting mass being allowed to escape from the mass.

6. The subject matter of claim 1, characterized by the fact that after the lignin has disappeared, the reaction melt is cooled and then the solidified resin resulting from the reaction is separated from other portions of the mass.

7. The subject matter of claim 1, characterized by the fact that the lignin is in the form of particles measuring not more than about one millimeter in every direction.

8. The process of claim 1, in combination with the step of heating the resinous products thereof to expel vapors therefrom to change the melting point thereof.

9. The subject matter of claim 2, characterized by the fact that the lignin is derived from alkaline solutions and the reacting mixture is heated to from about 260° C. to about 300° C.

10. The subject matter of claim 2, characterized by the fact that the lignin is derived from the saccharification of vegetable matter, and the reacting mixture is heated to from about 300° C. to about 360° C.

11. The subject matter of claim 1, characterized by the fact that less than about one two-hundredths of a part of mineral acid is included in the mixture.

12. The process of claim 1 in combination with the step of heating the resinous product thereof with a mixture of glycerine and sulphuric acid in the proportions, for each 100 parts of the resinous product, from about 4 to about 10 parts of glycerine and from about 1.4 to about 4 parts of concentrated sulphuric acid.

EDUARD FARBER.

REFERENCES CITED

The following references are of record in the file of this patent:

UNITED STATES PATENTS

| Number | Name | Date |
|---|---|---|
| 2,201,797 | Scott | May 21, 1940 |
| 2,312,807 | Farber (1) | May 3, 1943 |
| 2,343,215 | Farber (2) | Feb. 2, 1944 |
| 2,357,090 | D'Alelio | Aug. 29, 1944 |

OTHER REFERENCES

Hydrolysis of Oat Hulls with Hydrochloric Acid, Ind. and Chem. Eng., Feb. 1936, pages 206–208.

Certificate of Correction

Patent No. 2,443,576.                                                                June 15, 1948.

EDUARD FARBER

It is hereby certified that errors appear in the printed specification of the above numbered patent requiring correction as follows: Column 5, line 72, claim 1, and column 6, line 6, claim 2, after "a" and before the word "homogeneous" insert *substantially*; and that the said Letters Patent should be read with these corrections therein that the same may conform to the record of the case in the Patent Office.

Signed and sealed this 5th day of October, A. D. 1948.

[SEAL]

THOMAS F. MURPHY,
*Assistant Commissioner of Patents.*